(12) United States Patent
Zheng et al.

(10) Patent No.: US 7,052,363 B2
(45) Date of Patent: May 30, 2006

(54) METHOD AND APPARATUS FOR TREATING THE SURFACE OF A MEDIA, SUCH AS A MAGNETIC HARD DISK, WHILE OPERATING, SUCH AS DURING DYNAMIC ELECTRICAL TESTING

(75) Inventors: Guo Qiang Zheng, Dongguan (CN); Jia Bing Shen, Dongguan (CN); Yu Li, Dongguan (CN); Hong Tian, Hong Kong (CN)

(73) Assignee: SAE Magnetics (H.K.), Ltd., Hong Kong (CN)

( * ) Notice: Subject to any disclaimer, the term of this patent is extended or adjusted under 35 U.S.C. 154(b) by 177 days.

(21) Appl. No.: 10/097,682

(22) Filed: Mar. 13, 2002

(65) Prior Publication Data

US 2003/0096558 A1 May 22, 2003

(30) Foreign Application Priority Data

Nov. 20, 2001 (WO) .................... PCT/CN01/01569

(51) Int. Cl.
*B24B 5/00* (2006.01)

(52) U.S. Cl. ............................ 451/5; 451/63; 451/103; 451/317

(58) Field of Classification Search .................. 451/63, 451/103, 146, 182, 317, 318, 246, 254, 258, 451/290, 312, 324, 552, 555, 557, 558, 548, 451/5; 29/90.01
See application file for complete search history.

(56) References Cited

U.S. PATENT DOCUMENTS

| | | | | |
|---|---|---|---|---|
| 5,782,680 A | * | 7/1998 | Pilsan ........................ | 451/317 |
| 5,980,369 A | * | 11/1999 | Burga et al. ................ | 451/317 |
| 6,249,945 B1 | * | 6/2001 | Lee ............................ | 29/90.01 |
| 6,296,552 B1 | * | 10/2001 | Boutaghou et al. ........... | 451/41 |
| 6,322,431 B1 | * | 11/2001 | Schaenzer et al. .......... | 451/317 |

\* cited by examiner

*Primary Examiner*—Lee D. Wilson
*Assistant Examiner*—Anthony Ojini
(74) *Attorney, Agent, or Firm*—Kenyon & Kenyon

(57) ABSTRACT

A system and method for treating (e.g. polishing to remove defects) the surface of a media, such as a magnetic hard disk, while in operation, such as during dynamic electrical testing is disclosed. Further, a method for manufacturing a head for treating the surface of a media is disclosed.

14 Claims, 12 Drawing Sheets

Burnishing Head Attached to HGA

METHOD AND APPARATUS FOR TREATING THE SURFACE OF A MEDIA, SUCH AS A MAGNETIC HARD DISK, WHILE OPERATING, SUCH AS DURING DYNAMIC ELECTRICAL TESTING

BACKGROUND INFORMATION

The present invention relates to magnetic hard drive manufacturing. More specifically, the present invention relates to a system for treating (e.g. polishing to remove defects) the surface of a media, such as a magnetic hard disk, while in operation, such as during electrical testing.

In a continuing effort to improve magnetic hard drive performance, efficiency, and reliability, different methods are utilized to improve quality control. One method in the art includes cleaning and burnishing a hard disk following the deposition of thin film layers to remove debris and asperities from the surface. To support ever-increasing areal-density requirements, parameters such as flying height, disc roughness, and carbon thickness are continually reduced. The successful manufacture of disks capable of meeting these parameters requires improvements to hard disk preparation.

In the art, a burnishing head, which replaces the slider of a hard drive suspension such as a head gimbal assembly (HGA), is used to swab the disk surface on-line during dynamic electrical testing (DET) of magnetic heads. Such burnishing heads are typically created by diamond-grinding means, which provides a burnishing surface that can result in a dispersal of unwanted head particles as well as a propensity to chip. Further, the typical burnishing head design can cause abrupt takeoffs as well as high dynamic pitch angles, being unable to provide a burnishing surface substantially parallel to the media surface (hard disk) as is needed for optimal polishing.

Several different burnishing head designs are currently utilized in media manufacture (e.g. U.S. Pat. No. 6,267,645; U.S. Pat. No. 6,249,945; and U.S. Pat. No. 5,782,680). Some heads have a burnishing ridge providing a burnishing edge that extends across the entire widthwise surface of the head. Other head designs have burnishing pads only on various points of the burnishing surface, but have a lengthwise channel between two members.

An ineffective burnishing head may result in a lower glide yield, while an overly aggressive glide head may result in scratches and damage to the disk surface, which can lead to disk corrosion. The most commonly used burnishing head has a polyangular design, such as rectangular and triangular, with a grinding wheel-cut waffle pattern.

FIG. 1 provides a burnishing head as is typical in the art. The fabrication of such 'waffle' burnish heads is accomplished by slotting the head substrate with a diamond grinding wheel (See FIG. 2) and taper-lapping. Unfortunately, utilizing these manufacturing methods (to achieve this design) results in a high likelihood of micro-fractures in the ceramic and a high level of particulate production. The sharp corners 102 (typical) of this design are stress concentration areas that are easily broken off and embedded into the disc. Further, as stated, the burnishing head typically has a taper 104 at the leading 106 and/or trailing 108 edge.

FIG. 2 provides an illustration of the grinding steps for creating the 'waffle head' pattern as is used in the art. First, several parallel grooves are carved out of the burnishing material with a grinding wheel in a diagonal direction 202. Second, several parallel grooves are carved out with the grinding wheel in the other (perpendicular) diagonal direction 204. Third, the material is cut entirely through in a direction perpendicular to the material's length 206, yielding individual ('waffle head') burnishing pads 208.

Such heads are designed for media manufacture to burnish rough surfaces and are too aggressive to adapt to swab the testing surface of media during DET of magnetic heads. It is therefore desirable to have a system for treating (e.g. polishing to remove defects) the surface of a media such as a magnetic hard disk while on-line without the aforementioned problems.

DETAILED DESCRIPTION

Figure 1:
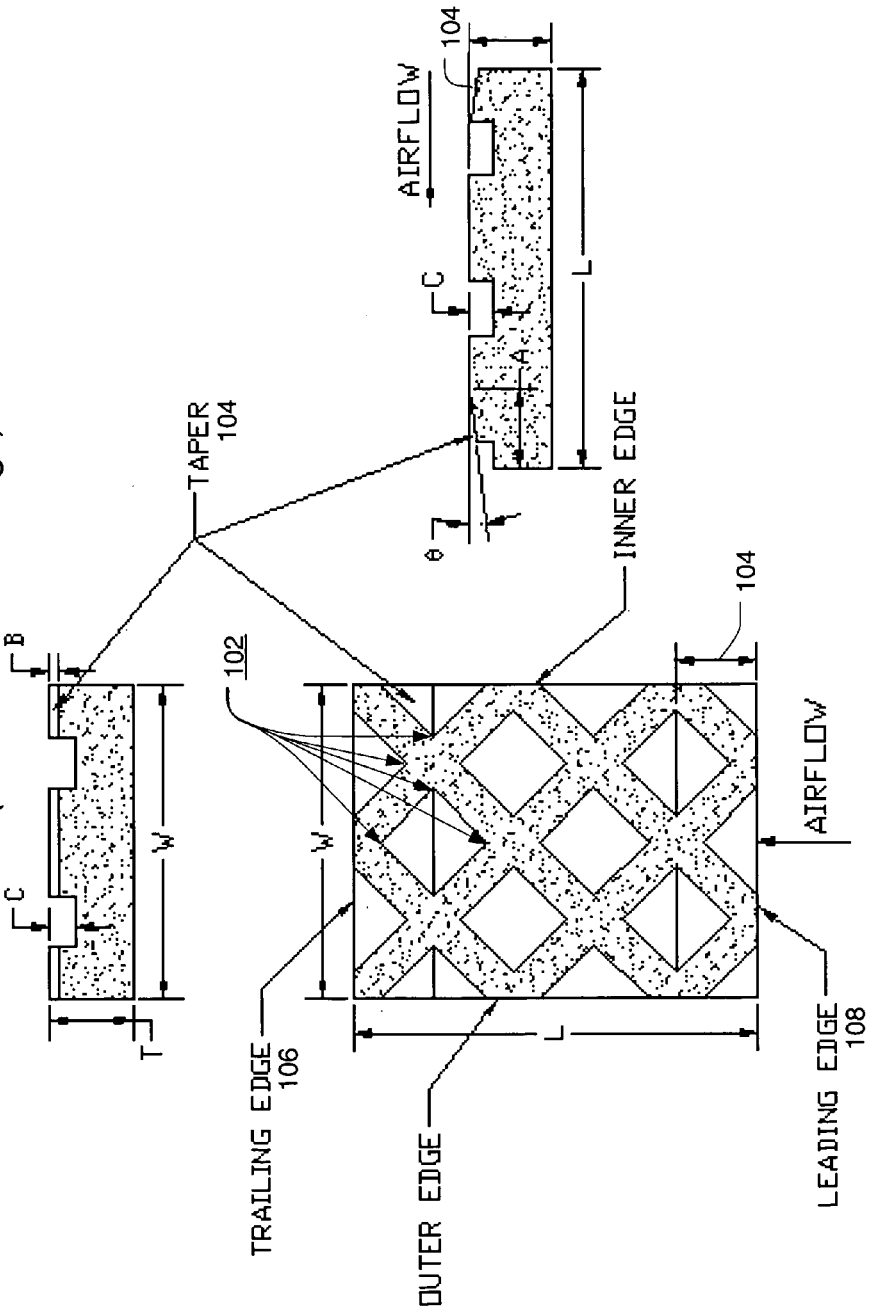
FIG. 1 provides a burnishing head as is typical in the art.
Figure 2:
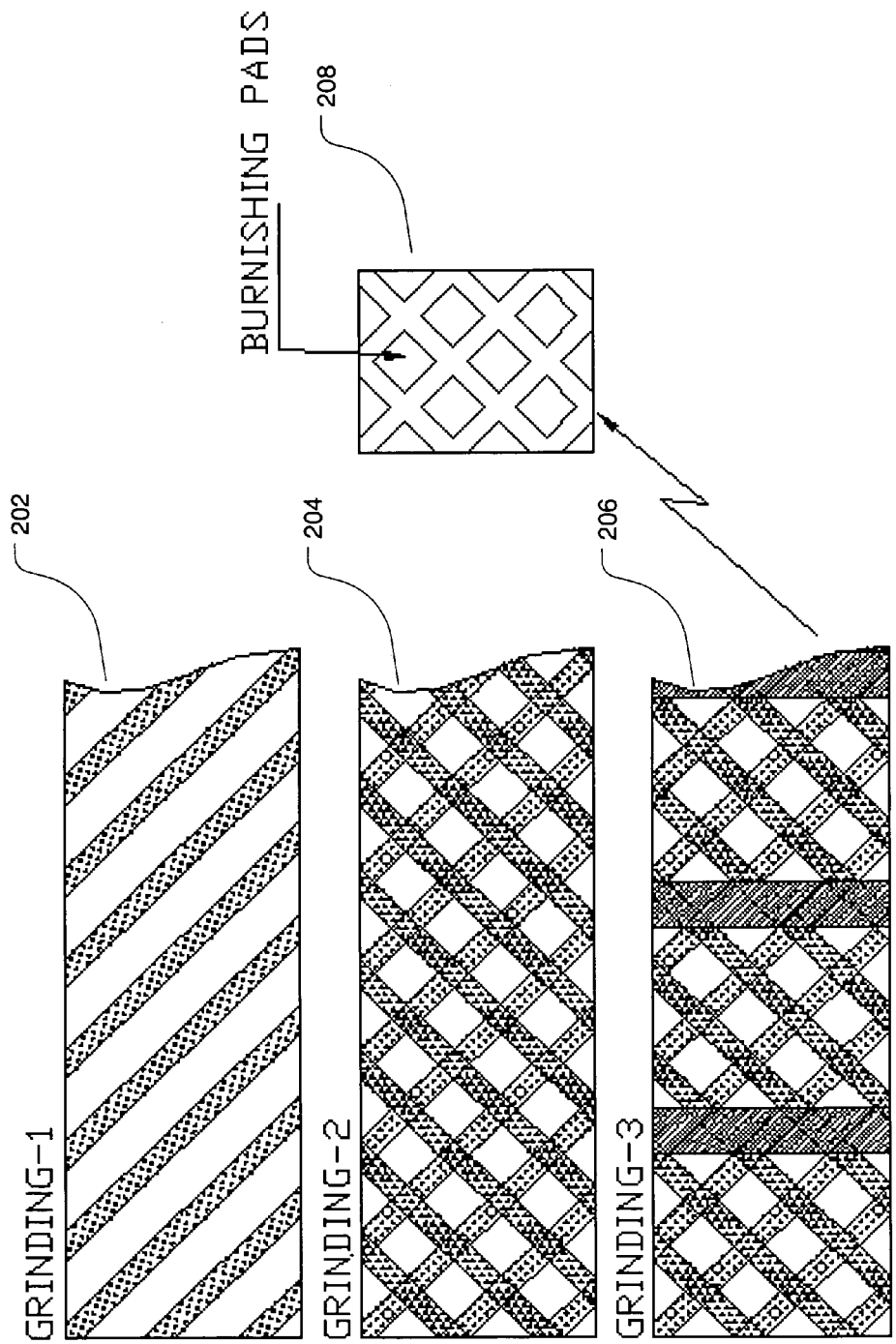
FIG. 2 provides an illustration of the grinding steps for creating the 'waffle head' pattern as is used in the art.
Figure 3:
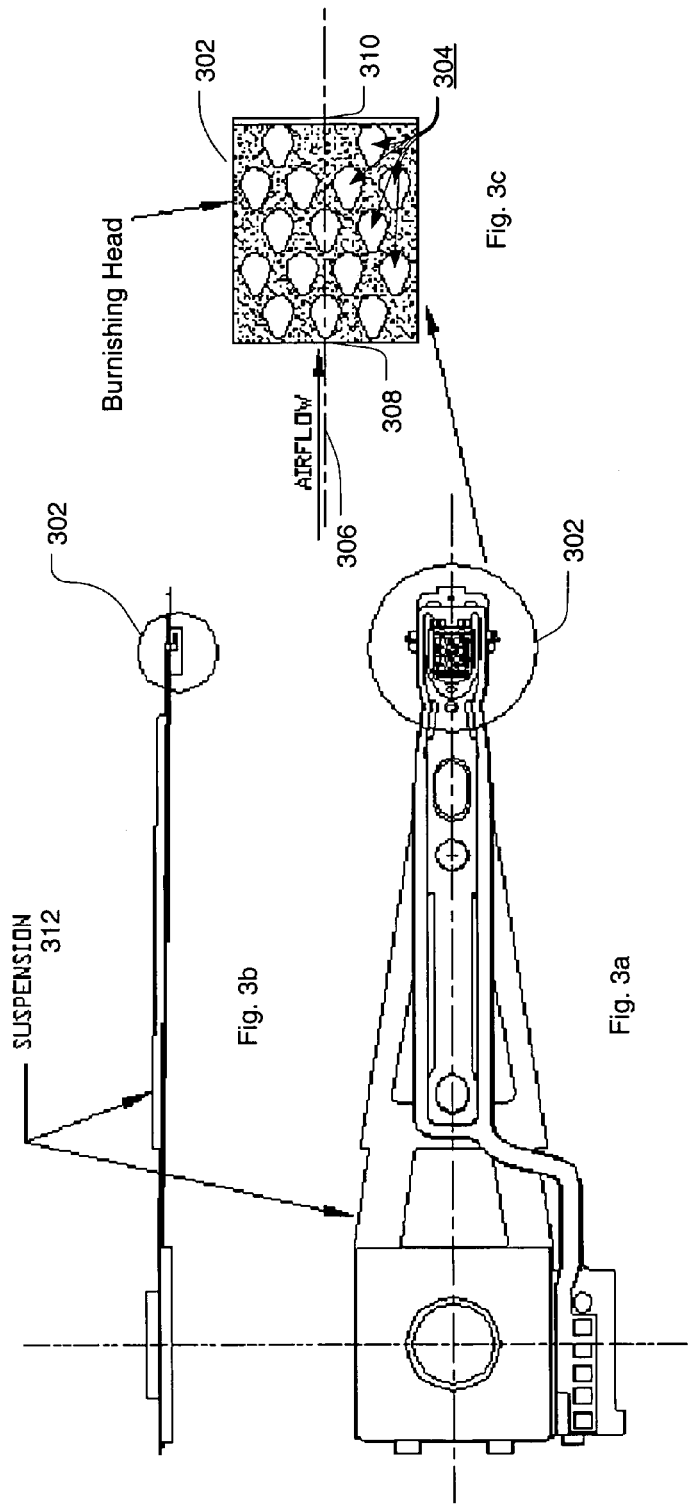
FIG. 3 provides an illustration of a burnishing head under principles of the present invention.

FIG. 3 provides an illustration of a burnishing head (attached to an HGA) under principles of the present invention. In one embodiment, the burnishing head (slider) 302 includes a plurality of elliptical pads 304 (typical) that are symmetrically arranged with respect to the burnishing head's axis (of symmetry) 306. In an embodiment, the pads 304 are created by ion-etching instead of diamond-grinding to reduce head particulate production and propensity to chip. Further, in an embodiment, the burnishing head 302 design does not incorporate a taper on the leading edge 308 or the trailing edge 310. This is to avoid fast (abrupt) takeoffs and high dynamic pitch angles. As explained below, pad 304 design and distribution, together with the short length and flatness of the air-bearing surface (ABS), enable burnishing head (slider) flight substantially parallel to the media surface. In an embodiment, the bottom surface of the burnishing head is coated with silicon & diamond-like carbon (DLC) to optimize head/disk interface (HDI). As described below in FIG. 11, working in combination with a DET machine, such as by Guzik Technical Enterprises™, the burnishing head 302 is loaded at 'inner diameter' (ID), and slides slowly from ID to 'outer diameter' (OD) as the disk rotates and is then unloaded at OD (See FIG. 11). This helps to remove contamination and particle asperity on the testing tracks, which can increase product yield and decrease media consumption.

In one embodiment of the present invention, the burnishing head 302 is made from a dummy magnetic wafer or conventional ceramic, such as by recycling waste wafers. The ion-etching process provides a wide range of burnish head design possibilities. In combination with photolithography, ion-etching can produce a vast array of elliptical geometric shapes. Also, as stated, the elliptical shapes capable of being produced with ion-etching can provide improved performance, reduced chipping, and a lower level of disc damage when compared to typical grinding methods.

In one embodiment, the burnishing head 302 is made from a dummy magnetic wafer (row bar) or a rectangular body of ceramic material (recycled material). The pads 304 are carved out by ion milling (IM). IM is utilized instead of reactive ion etch (RIE) because of the dangers associated with performing RIE upon alumina layers, e.g. danger of core metal exposure. By contrast, the process of IM is performed on all material at almost the same rate.

As stated, in one embodiment, the burnishing head 302 includes no tapering on the leading edge 308 or trailing edge 310 of the air bearing surface (ABS) to avoid fast takeoff or high dynamic pitch. The placement of the pads 304, in combination with the flat ABS, provides substantially parallel flight over the media to be polished. This ensures light (gentle) media contact to remove surface defects. Further, utilizing the entire ABS for polishing avoids stress concentration. Heavy contact by the burnishing head 302 upon the disk may cause head vibration and could damage the carbon overcoat. Further, during 'loading and unloading' (LUL), any dynamic pitch and roll of the burnishing head 302 could cause an edge of the burnishing head 302 to gouge the media. Further, as stated, to improve the HDI in one embodiment, the burnishing surface of the head 302 is coated with silicon & DLC for lubrication and to enhance durability. The silicon/DLC coating is provided after IM to settle loose particles due to re-deposition.

In an embodiment, the burnishing head 302 size is about the same as current sliders (1.235×1.0×0.3 millimeter), and taking advantage of head gimbal assembly (HGA) assembly processes, the burnishing head 302 is mounted on a related suspension 312 so as to be used on-line without fixture limitation during the DET of the project.

Figure 4:
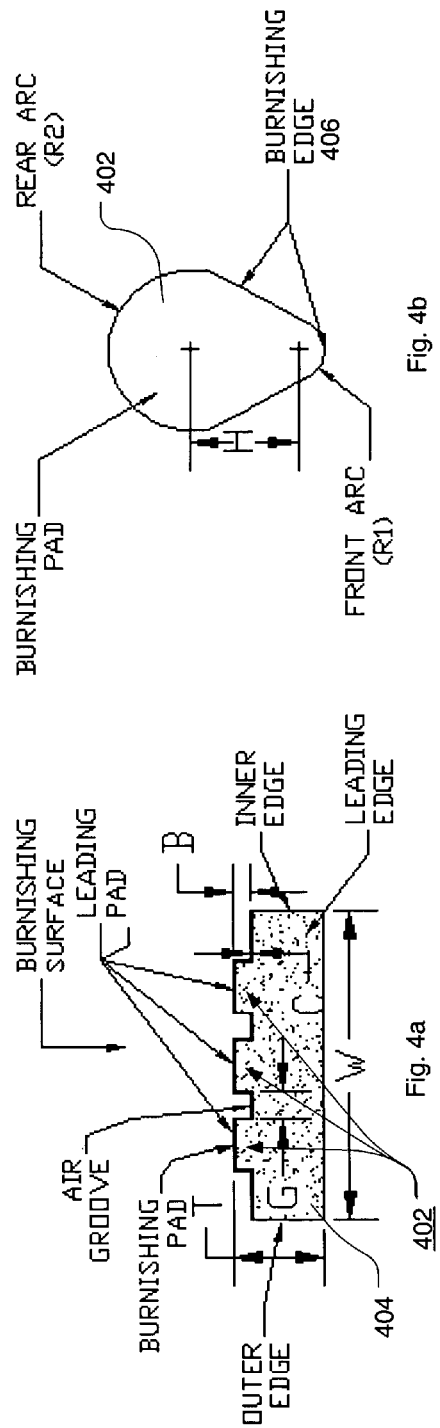
FIG. 4 provides a cross-section of the burnishing head and the design of an elliptical burnishing pad under principles of the present invention.

FIG. 4 provides a cross-section of the burnishing head and the design of an elliptical burnishing pad under principles of the present invention. In one embodiment, the pads 402 are evenly distributed across the burnishing head's 404 width. In one embodiment, each pad 402 is oriented such that the burnishing edge 406 faces towards the leading edge of the head 404 to collect contaminants as well as to smooth disk asperities. In an embodiment, the elliptical (tear drop) pad design 402 causes the burnishing head 404 to be less sensitive to the skew angle of airflow when the head moves during a seek operation (See FIG. 12). Further, the pad design 402 minimizes contact stress with the media. As stated, in an embodiment, the head 404 surface has a flat ABS, including a flat crown, camber and twist profile (See FIG. 7), to ensure that all burnishing pads 402 are parallel to the surface of the media and are taking part in burnishing.

Figure 5:
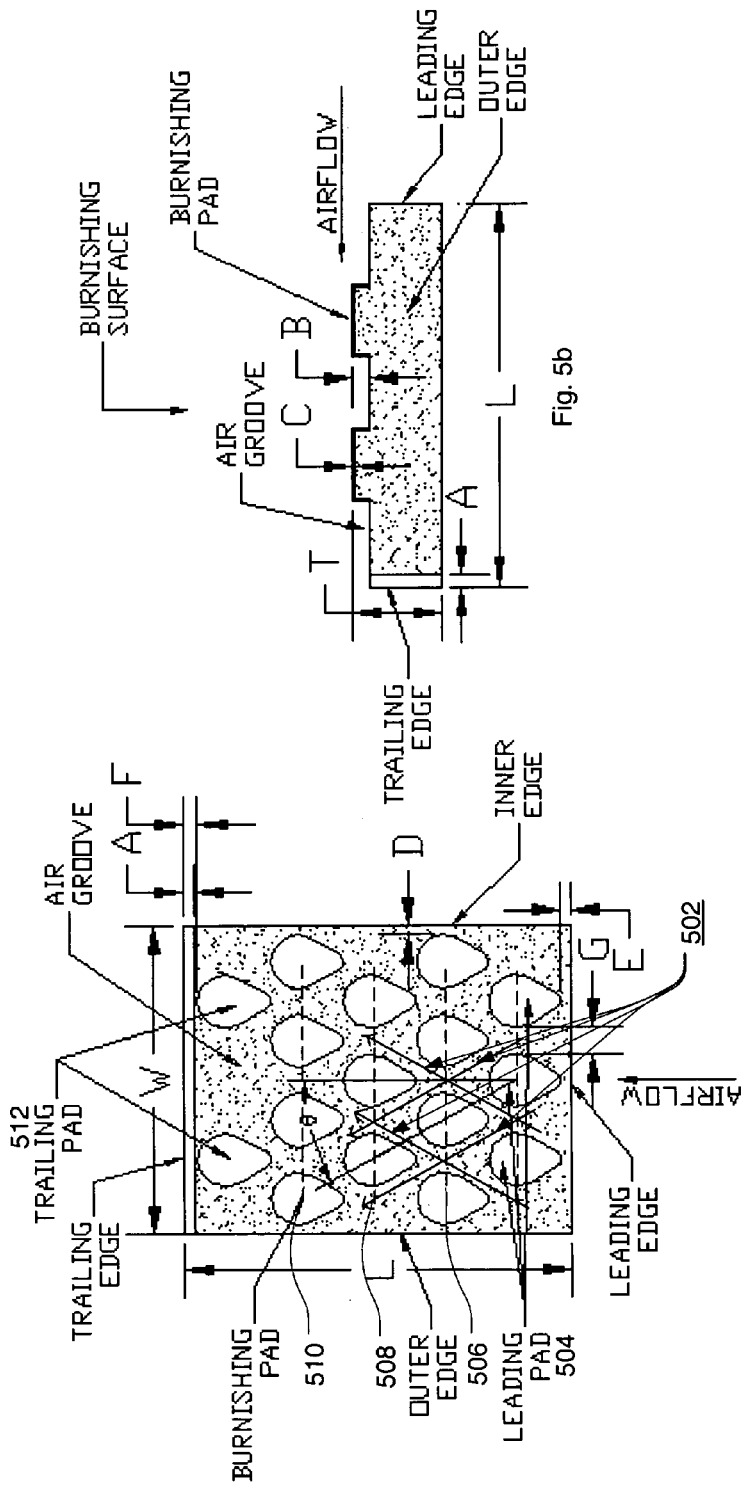
FIG. 5 provides a bottom view and a side cross-section of a burnishing head under principles of the present invention.

FIG. 5 provides a bottom view and a side cross-section of a burnishing head under principles of the present invention. In one embodiment, the pad 502 configuration includes three evenly distributed leading pads 504, followed by a second row with four evenly distributed pads 506, which is followed by a third row with three evenly distributed pads 508, followed by a fourth row with four evenly distributed pads 510, and then by two trailing pads 512. The distribution of pads 502 (typical) provides a generally crisscrossed pattern.

In an embodiment, the elliptical pad design causes the area between the pads 502 to be partially evacuated with respect to the surrounding pressure during movement over a media surface. This vacuum is created by the airflow's increased surface velocity (compared to airflow surface velocity). In an embodiment, the generated vacuum provides an evenly distributed suction force lightly holding the burnishing head to the media surface. (See FIG. 9). This characteristic aids in absorbing and removing contaminants, as well as maintaining flight stability.

Figure 12:
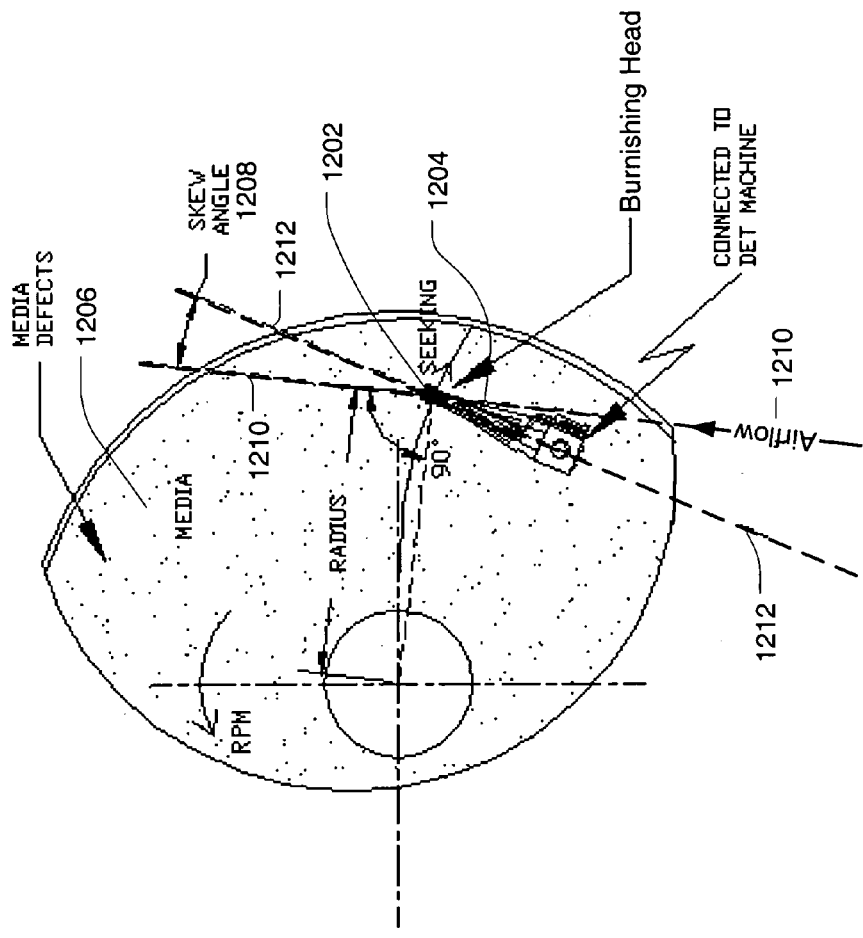
FIG. 12 provides a top view of a burnishing head with its associated suspension in contact with a magnetic hard disk under principles of the present invention.

In one embodiment, the angle, θ, of the air grooves (paths) 502 (typical) is more than 25° in order to avoid any burnishing gaps when the head seeks to specific tracks causing large skew angles (See FIG. 12). Also, in one embodiment, the trailing pads 512 do not include a center pad in order to balance the air pressure below the burnishing head and to obtain an ideal flying attitude.

Figure 6:
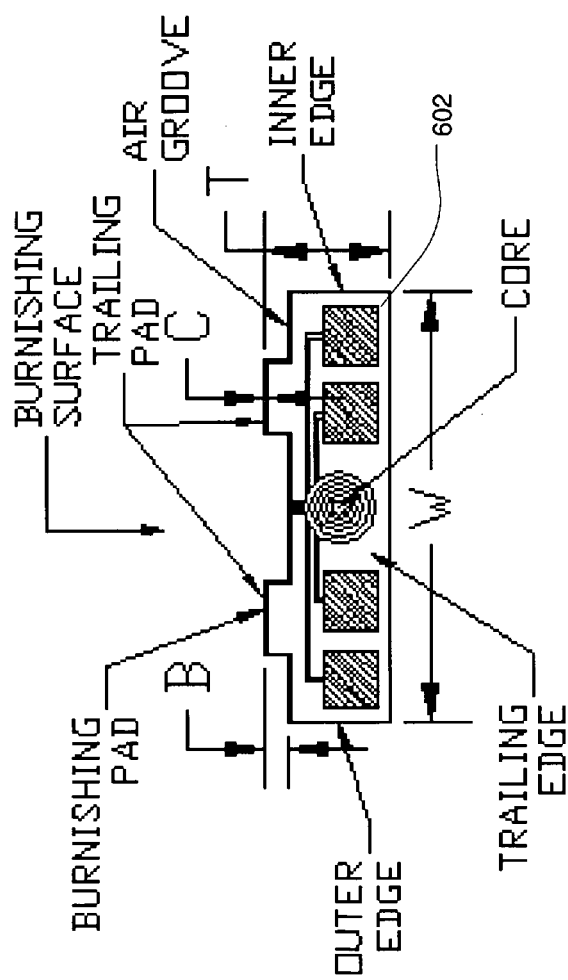
FIG. 6 provides a cross-section of a burnishing head's trailing edge under principles of the present invention.

FIG. 6 provides a cross-section of a burnishing head's 602 trailing edge under principles of the present invention.

Figure 7:
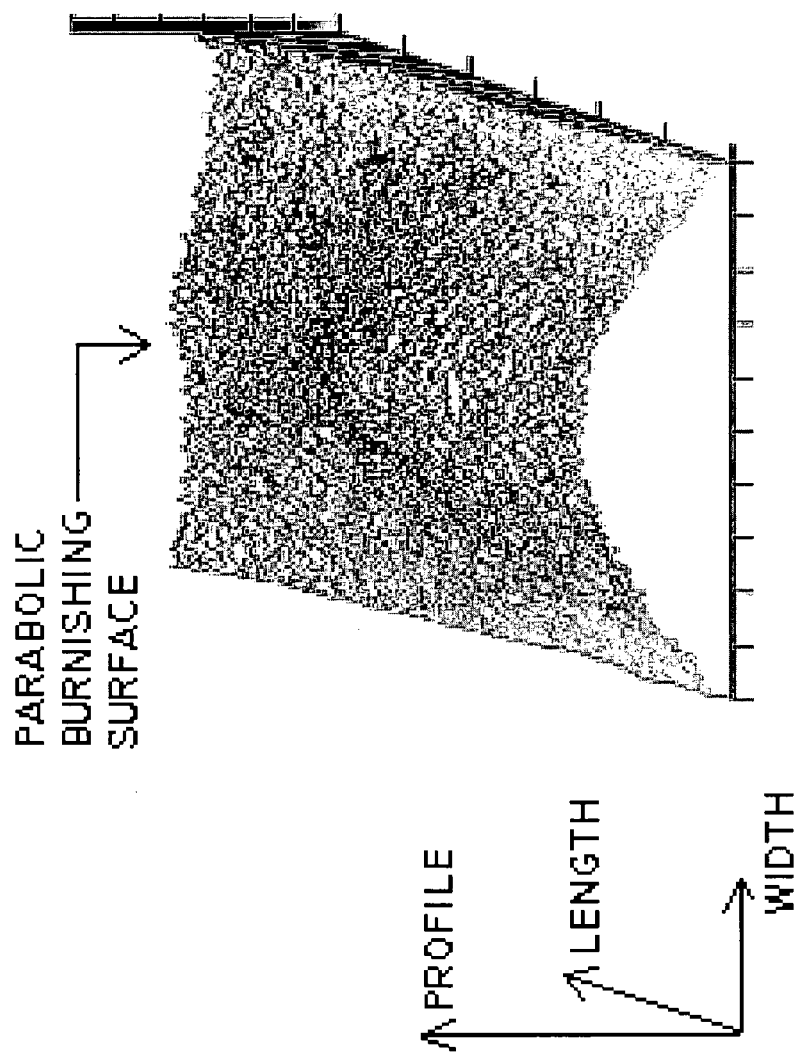
FIG. 7 is a perspective view of a parabolic profile for the ABS, such as crown, camber and twist for term descriptive purposes.

FIG. 7 is a perspective view of a parabolic profile for the ABS, such as crown (parabolic deformation in length), camber (parabolic deformation in width) and twist (parabolic deformation causing equal displacement of diagonal corners) for term descriptive purposes.

To further explain, 'crown' is parabolic deformation of the slider in the length direction. A positive crown indicates a convex deformation (smaller spacing at slider center), while negative crown indicates a concave deformation (larger spacing at slider center). Crown is calculated as follows:

$$\text{displacement at } (x, y) = 4R\left(\frac{x}{L} - \left(\frac{x}{L}\right)^2\right)$$

Where L is the slider length and R is crown.

'Camber' is parabolic deformation of the slider in the width direction. A positive camber indicates a convex deformation (smaller spacing at slider center), while negative camber indicates a concave deformation (larger spacing at slider center). Camber is calculated as follows:

$$\text{displacement at } (x, y) = 4A\left(\frac{y}{W} - \left(\frac{y}{W}\right)^2\right),$$

where W is the slider width and A is camber.

'Twist' is parabolic deformation of the slider causing equal displacement of diagonal corners. A positive twist indicates the inner leading edge and outer trailing edge are recessed (larger spacing), while the outer leading and inner trailing edges are railed (smaller spacing). Twist is defined as follows:

$$\text{displacement at } (x, y) = 4T\left(\frac{x}{L} - 0.5\right)\left(\frac{y}{W} - 0.5\right),$$

where L is the slider length, W is the slider width, and T is twist.

Figure 8:
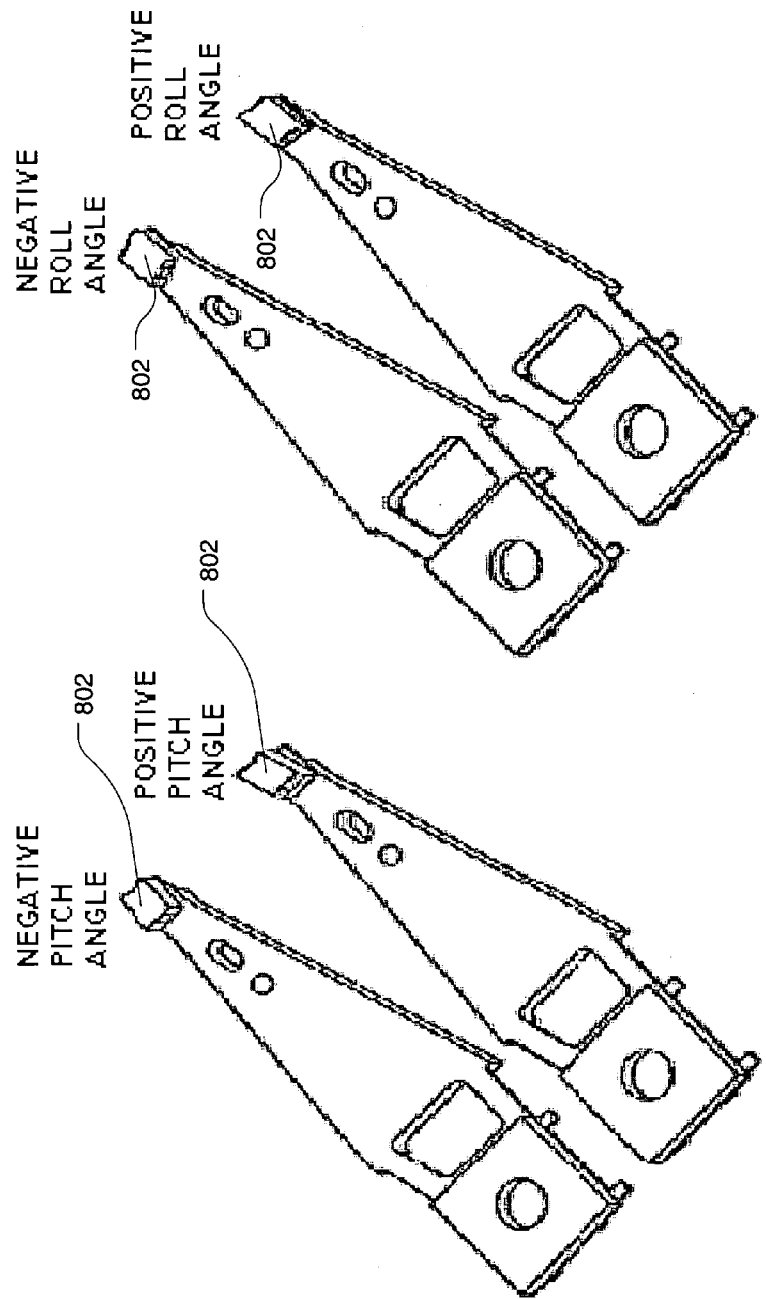
FIG. 8 describes the various burnishing head orientations with respect to the media surface for purposes of description.

FIG. 8 describes the various slider (burnishing head) 802 orientations (with respect to the media surface) for purposes of description.

Figure 9:
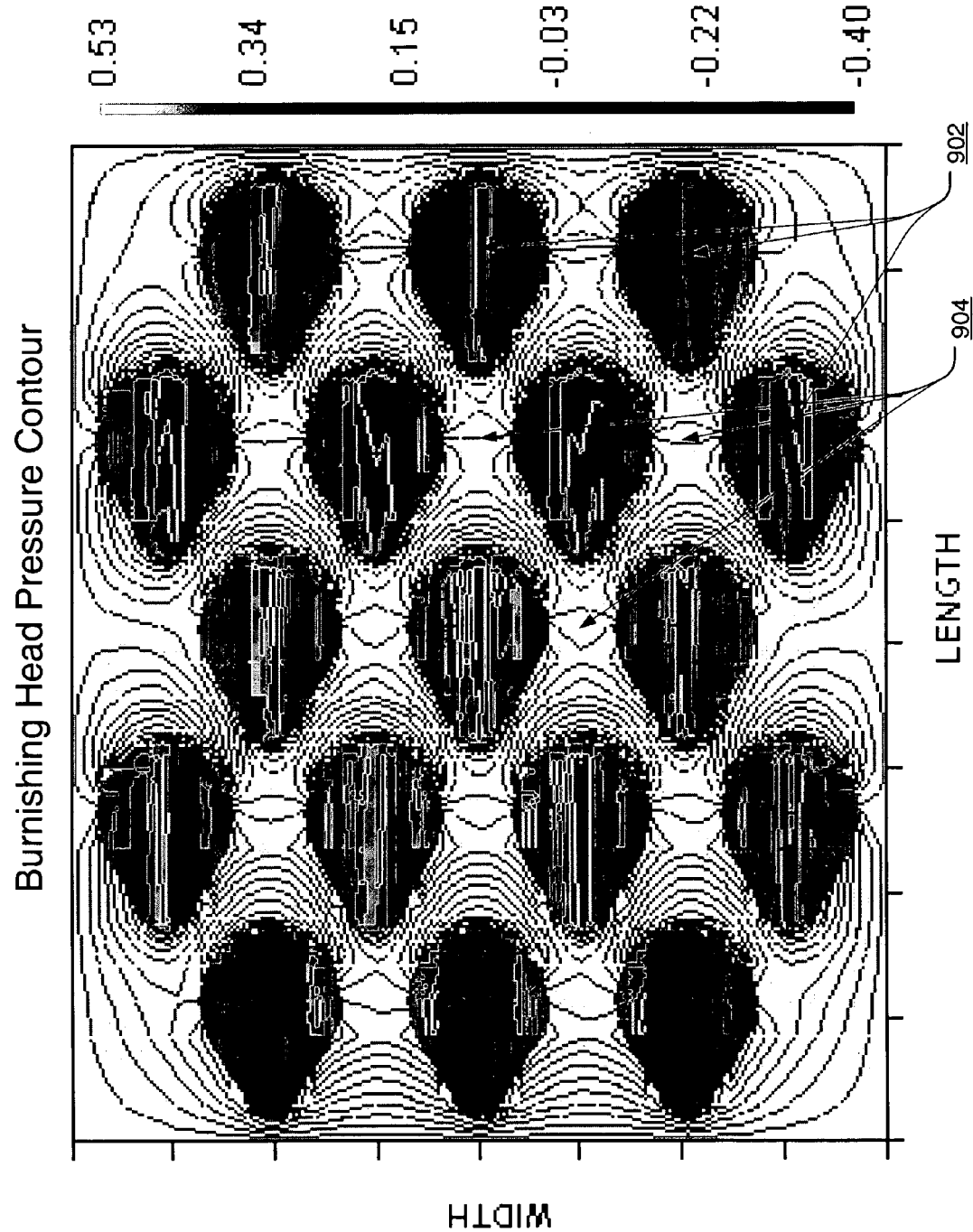
FIG. 9 provides a pressure contour of a burnishing head under principles of the present invention.

FIG. 9 provides a pressure contour of a burnishing head under principles of the present invention. As stated, in one embodiment, the distribution and design of the pads 902 (typical) cause low pressure regions (vacuum) 904(typical) that provide a balanced suction force for the burnishing head.

In an embodiment, the elliptical pad design 902 causes the area between the pads 904 to be partially evacuated with respect to the surrounding pressure during movement over a media surface. This vacuum is created by the airflow's increased surface velocity (compared to airflow surface velocity). In an embodiment, the generated vacuum provides an evenly distributed suction force lightly holding the burnishing head to the media surface. This characteristic aids in absorbing and removing contaminants, as well as maintaining flight stability.

Figure 10:
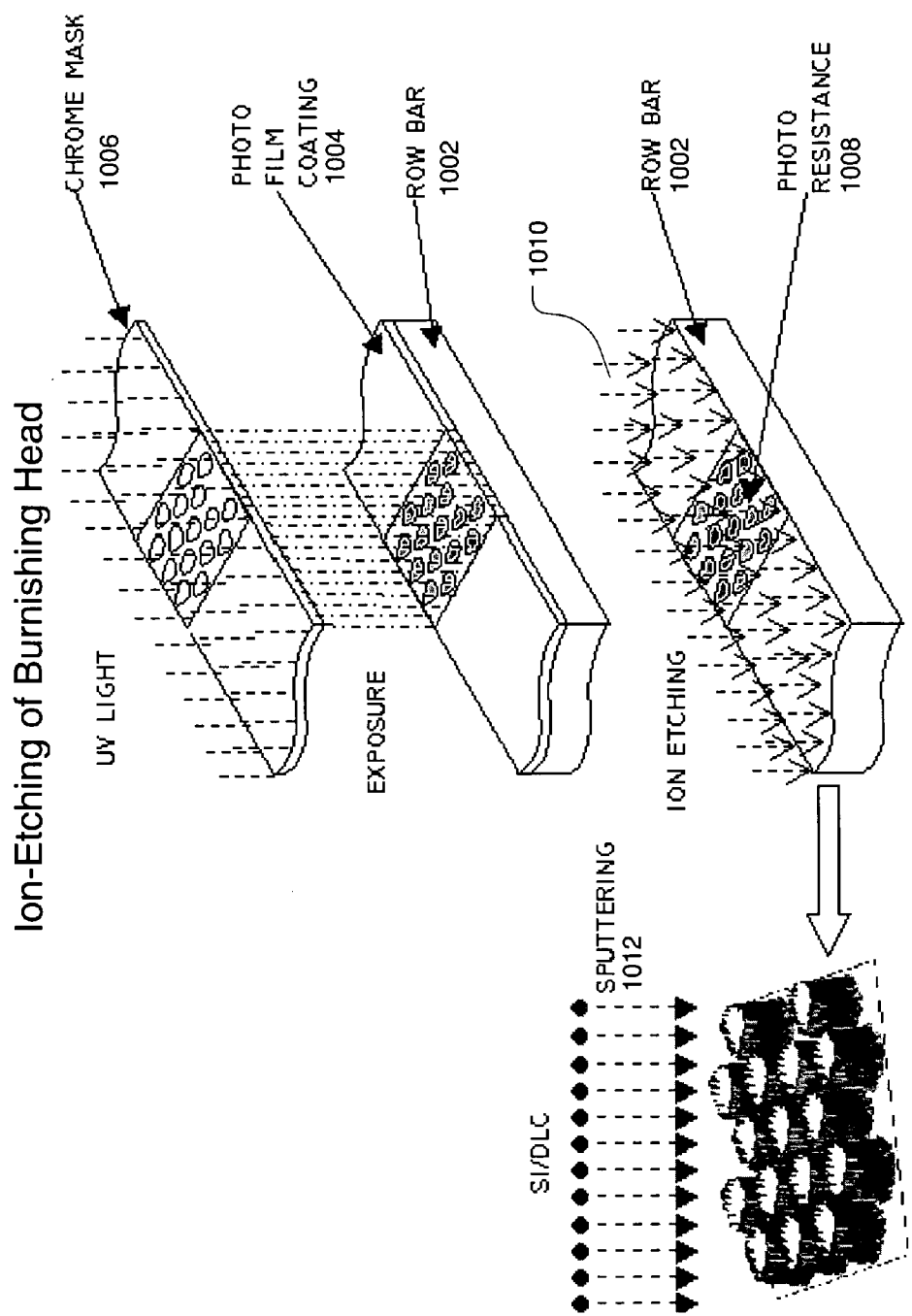
FIG. 10 illustrates the process of ion-etching and sputtering for manufacturing a burnishing head under principles of the present invention.

FIG. 10 illustrates the process of ion-etching and sputtering for manufacturing a burnishing head under principles of the present invention. As stated, ion-etching is capable of producing a vast array of complex geometric shapes. Virtually any two-dimensional shape can be ion-etched into the surface of a ceramic slider body, and the etched surface remains virtually stress-free and absent of micro-fractures resulting in reduced head particulate production and propensity to chip. Also in an embodiment, as stated, the burnishing head is made from a dummy wafer with core material enclosed. The pads are carved out with physical IM, not chemical RIE, preventing the hazards of using RIE on an alumina layer (e.g., core metal exposure).

In one embodiment, a row bar 1002 or a strip of ceramic material is wholly covered with photo-film 1004. In an embodiment, a chrome mask 1006, defining the pad configuration, is utilized. The film coating 1004 is then exposed to ultra-violet light through the mask 1006. In an embodiment, a developer (0.75% $Na_2CO_3$) removes the unexposed area while the exposed area forms the film pattern attached on the surface of row bar 1002, which is the photo resistance 1008 to protect the area from ion-etching 1010. The depth of the air grooves (height of the pads) is generally controlled by the amount of time ion-etching 1010 is performed.

Next, in one embodiment, a carbon-thin film overcoating is formed on the entire burnishing surface (including the air groove). Utilizing sputtering 1012 techniques, the surface of the burnishing head is coated with silicon & DLC. As stated, this is done after ion milling (IM) in order to settle loose particles due to re-deposition and for interface lubrication and head durability. In one embodiment, this entire process is done in a relative vacuum.

Next, in an embodiment, the individual burnishing heads are separated, cleaned, and inspected (with a device such as an optical interferometry instrument; e.g., a Vecco™ device) to determine the ABS flatness.

Figure 11:
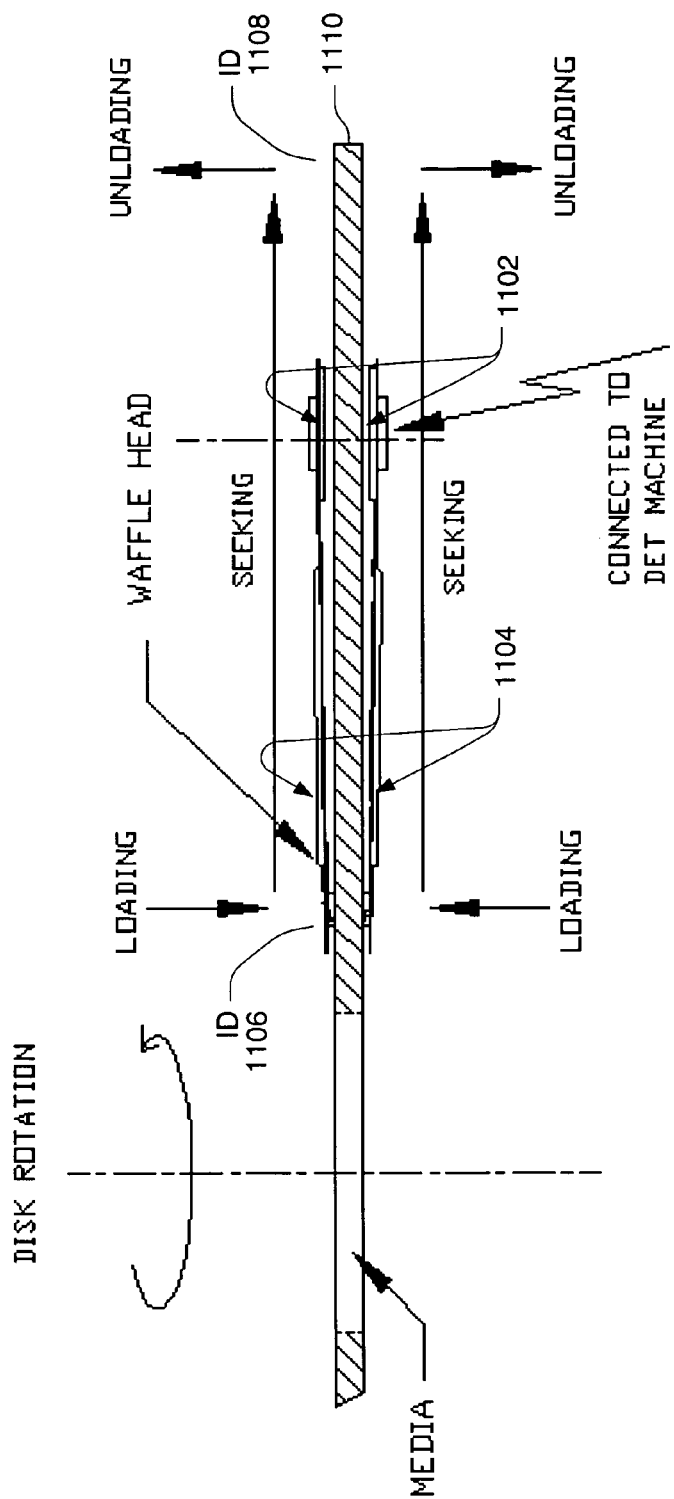
FIG. 11 shows a cross-section of top and bottom burnishing heads with their associated suspensions in contact with a magnetic hard disk under principles of the present invention.

FIG. 11 shows a cross-section of top and bottom burnishing heads 1102 with their associated suspensions 1104 in contact with a magnetic hard disk 1110 under principles of the present invention. As described above, the burnishing heads 1102 are loaded at 'inner disk' (ID) 1106, and slides slowly from ID to 'outer disk' (OD) 1108 as the media (disk) 1110 rotates and is then unloaded at OD 1108. This helps to remove contamination and particle asperity on the testing tracks, which can increase product yield and decrease media consumption.

FIG. 12 provides a top view of a burnishing head 1202 with its associated suspension 1204 in contact with a magnetic hard disk 1206 under principles of the present invention. Further, the airflow skew angle 1208 is illustrated. The skew is defined by the difference in angular orientation between the slider 1212 and the airflow direction 1210.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A system to affect a surface of a media comprising:
    a component having a leading edge and a trailing edge with respect to movement of the surface and plurality of elliptical pads, wherein each elliptical pad has a leading edge which is a first arc, said first arc having an axis perpendicular to the media surface, and a trailing edge which is a second arc, said second arc having an axis perpendicular to the media surface and a diameter greater than the first arc, wherein
    said component is to affect the media surface as the media and the component move with respect to each other by physical interference between said elliptical pads and said media surface.

2. The system of claim 1, wherein
    said elliptical pads are located on said component with a distribution that is substantially symmetrical with respect to an axis of said component, said axis being generally parallel to a motion vector of the component; and wherein
    said pad distribution provides a plurality of airflow pathways between said plurality of pads.

3. The system of claim 2, wherein the elliptical pads are located on the component with a sizing and distribution such that, as the component passes over the media surface, a substantially uninterrupted area of physical interference is provided generally equal to the width of a slider.

4. The system of claim 3, wherein the component is to polish the media surface and the plurality of elliptical pads form a burnishing surface.

5. The system of claim 4, wherein the burnishing surface is substantially flat in all planar directions; and wherein
    the pads are designed and distributed such that at least one low-pressure region is created in the plurality of pathways by airflow between said pads.

6. The system of claim 5, wherein the component is a ceramic dummy slider of waste wafer material.

7. The system of claim 5, wherein the component is a burnishing head and the media is a magnetic hard disk.

8. The system of claim 7, wherein said burnishing head is to polish said hard disk by moving from an inner diameter to an outer diameter of the disk as the disk rotates, said hard disk having a rate of angular velocity and said slider having a rate of radial velocity such that the slider forms a spiral path covering generally the entire surface of the hard disk.

9. The system of claim 8, wherein said burnishing head is to polish the surface of the disk while flying slightly above the disk surface.

10. The system of claim 9, wherein said burnishing head is to polish the surface of the disk while flying substantially flatly above the disk surface.

11. The system of claim 8 wherein each elliptical pad is teardrop-shaped.

12. The system of claim 8, wherein said plurality of elliptical pads is formed in the burnishing head by ion etching and lubricant overcoating.

13. The system of claim 12, wherein each elliptical pad is to contact the disk with a rounded pad surface and wherein lubricant overcoating includes applying silicon and diamond-like carbon (DLC).

14. The system of claim 12, wherein said burnishing head includes a substantially uniform distribution of sixteen elliptical pads with rows of pads ordered from a leading edge to a trailing edge with the following quantities:
- a leading edge row having three pads;
- a second row having four pads;
- a third row having three pads;
- a fourth row having four pads; and
- a trailing edge row having two pads;
- said distribution providing a generally crisscrossed pattern of elliptical pads.

* * * * *

UNITED STATES PATENT AND TRADEMARK OFFICE
CERTIFICATE OF CORRECTION

PATENT NO. : 7,052,363 B2  
APPLICATION NO. : 10/097682  
DATED : March 13, 2002  
INVENTOR(S) : Li Yu et al.

Page 1 of 1

It is certified that error appears in the above-identified patent and that said Letters Patent is hereby corrected as shown below:

Column 4, Line 16 "seeks to specific" should be --seeks specific--

Column 4, Line 27 "comers" should be --corners--

Column 7, Line 1 "claim 8 wherein" should be --claim 8, wherein--

Signed and Sealed this

Twenty-ninth Day of April, 2008

JON W. DUDAS  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,052,363 B2 | Page 1 of 1 |
| APPLICATION NO. | : 10/097682 | |
| DATED | : May 30, 2006 | |
| INVENTOR(S) | : Li Yu et al. | |

It is certified that error appears in the above-identified patent and that said Letters Patent is hereby corrected as shown below:

Column 4, Line 16 "seeks to specific" should be --seeks specific--

Column 4, Line 27 "comers" should be --corners--

Column 7, Line 1 "claim 8 wherein" should be --claim 8, wherein--

This certificate supersedes the Certificate of Correction issued April 29, 2008.

Signed and Sealed this

Twentieth Day of May, 2008

JON W. DUDAS
*Director of the United States Patent and Trademark Office*